United States Patent
Irvine

(10) Patent No.: US 9,135,455 B2
(45) Date of Patent: Sep. 15, 2015

(54) DISTRIBUTED FILE SYSTEMS

(75) Inventor: David Irvine, South Ayrshire (GB)

(73) Assignee: MAIDSAFE FOUNDATION, Troon (GB)

( * ) Notice: Subject to any disclaimer, the term of this patent is extended or adjusted under 35 U.S.C. 154(b) by 0 days.

(21) Appl. No.: 13/994,258

(22) PCT Filed: Dec. 16, 2011

(86) PCT No.: PCT/GB2011/052495
§ 371 (c)(1),
(2), (4) Date: Jun. 14, 2013

(87) PCT Pub. No.: WO2012/080744
PCT Pub. Date: Jun. 21, 2012

(65) Prior Publication Data
US 2013/0262865 A1    Oct. 3, 2013

(30) Foreign Application Priority Data
Dec. 16, 2010 (GB) .................................. 1021312.2

(51) Int. Cl.
G06F 21/60    (2013.01)
G06F 21/62    (2013.01)
G06F 17/30    (2006.01)

(52) U.S. Cl.
CPC ........ G06F 21/602 (2013.01); G06F 17/30165 (2013.01); G06F 17/30194 (2013.01); G06F 17/30206 (2013.01); G06F 21/6218 (2013.01)

(58) Field of Classification Search
CPC ..................................................... G06F 21/602
USPC ....................................................... 713/165
See application file for complete search history.

(56) References Cited

U.S. PATENT DOCUMENTS

2009/0060201 A1 * 3/2009 Rhodes et al. ................ 380/279
2013/0262865 A1    10/2013 Irvine

FOREIGN PATENT DOCUMENTS

| CN | 103370706 A | 10/2013 |
| GB | 2444339 A | 6/2008 |
| GB | 2486462 A | 6/2012 |
| WO | 03/012666 A1 | 2/2003 |
| WO | 2008/065342 A1 | 6/2008 |
| WO | 2012/080744 A1 | 6/2012 |

OTHER PUBLICATIONS

United Kingdom Search Report received for United Kingdom Patent Application No. GB1021312.2, dated Apr. 18, 2011, 3 pages.
International Search Report received for International Patent Application No. PCT/GB2011/052495, dated Apr. 12, 2012, 3 pages.
International Preliminary Report on Patentability and Written Opinion received for International Patent Application No. PCT/GB2011/052495, dated Jun. 27, 2013, 6 pages.

* cited by examiner

Primary Examiner — Jacob Lipman

(57) ABSTRACT

A method of providing a distributed file system allowing the storage of data comprising a plurality of directories and files arranged in a hierarchical structure on a key addressable storage system, the storage system being accessible by a plurality of users, the method comprising the steps of: storing data of a child directory on the storage system and creating a datamap which provides the at least one location of the stored data; assigning an identifier to the child directory and to a parent directory for the child directory; encrypting the datamap using both the child directory identifier and the parent directory identifier; and storing the encrypted datamap on the storage system using at least part of the child directory identifier as the key.

21 Claims, 1 Drawing Sheet

DISTRIBUTED FILE SYSTEMS

Figure 1:
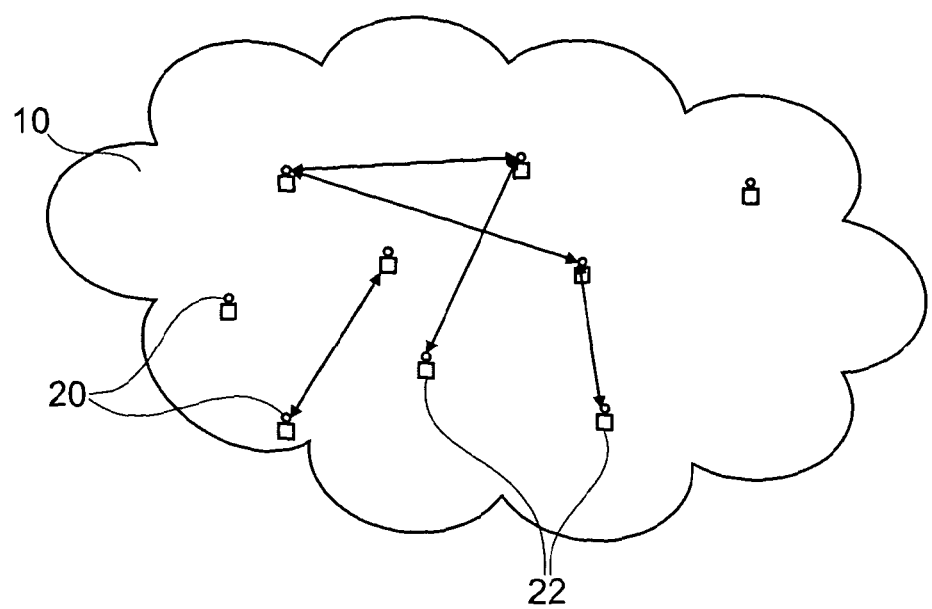

The present invention relates to distributed file systems. In particular, but not exclusively, the invention relates to distributed file systems provided on a peer to peer, decentralised or server-less network.

A distributed file system (DFS) allows a number of nodes on a network to share access to files, printers and the like. Conventionally, the DFS requires a server or control node. This is for a number of reasons including: validating user access and general security of data, allocating read/write privileges, managing resources, ensuring replication of data, file locking and so on. Indeed, there is a widespread belief that all these issues dictate that a centralised authority is necessary.

Regarding data security, the server or control node itself represents a target for attack. It is also a potential point of failure and, if a server fails, a currently open file can become unusable. Such file systems also require an indexing mechanism.

It is desirable to provide an improved DFS which has greater data security and/or is less prone to system failure. It is desirable to provide a distributed file system without centralised control or indexing.

Protocols such as Server Message Block (SMB), also known as Common Internet File System (CIFS), operate as an application-layer network protocol to provide compatibility for file sharing. SMB uses a client-server approach. However, such protocols are known to have a number of disadvantages or limitations in addition to the above issues. For instance, SMB can result in a significant increase in broadcast traffic on a network, and this problem increases as network size increases. A DFS is typically used by, and limited to, members of an organization but, even for a network of this size, broadcast traffic can be a problem. Also, latency can have a significant impact on network performance. There have also been concerns over data security, a recent one involving the implementation of SMB2.

Furthermore, there are differences in file systems between operating systems, or even versions of operating systems, on how they handle access to data via a file system. These differences can make file sharing more problematic. As the size of the network increases, the number of operating systems or versions of operating systems is likely to increase.

It is desirable to provide a more universal file system that implements at least a minimum set of features that can operate cross platform. It is desirable to provide a DFS suitable for a large, even unlimited size, network. Such a file system may represent itself to a user as a native file system on any platform, and as such may utilise low level drivers and code to be installed alongside any application using it. It is desirable to provide a file system which allows a large, even unlimited, number of levels of directory structure.

Within this specification, the term "key" is used in respect to the key of a DHT "key, value" pair. Cryptographic private and public keys will be referred to as $K_{priv}$ and $K_{pub}$ respectively. Also, the following notation will be used:

H=Hash function such as SHA, MD5 or the like;
$XXX_{priv}$, $XXX_{pub}$=Private and public keys respectively of a cryptographic key pair named XXX;
$SymEnc_{PASS}$(Data)=Symmetrically encrypt Data using PASS;
Sig $[K_{priv}]$ (Data)=Create asymmetric signature of Data using $K_{priv}$;
+=Concatenation; and
⊕=Bitwise Exclusive Or (XOR).

According to the present invention there is provided a method of providing a distributed file system allowing the storage of data comprising a plurality of directories and files arranged in a hierarchical structure on a key addressable storage system, the storage system being accessible by a plurality of users, the method comprising the steps of:

storing data of a child directory on the storage system and creating a datamap which provides the at least one location of the stored data;
assigning an identifier to the child directory and to a parent directory for the child directory;
encrypting the datamap using both the child directory identifier and the parent directory identifier; and
storing the encrypted datamap on the storage system using at least part of the child directory identifier as the key.

A datamap can be considered to be a map of data elements or pieces of data elements that allows retrieval of such elements in a key addressable storage system. It is to be noted that decryption of the datamap, and thus access to the stored data of the child directory, requires both the child directory identifier and the parent directory identifier. However, the parent directory identifier cannot be derived from the datamap or stored data. Also, the stored data of the parent directory is not accessible using only the child directory identifier and the parent directory identifier.

The stored data of the child directory may be accessible using the child directory identifier and the parent directory identifier. The stored data of the child directory may comprise one or more grandchild directories which are accessible using the child directory identifier and a grandchild directory identifier.

The method may include the steps of:
creating a second datamap which provides the at least one location of the stored data of the grandchild directory;
assigning an identifier to the grandchild directory;
encrypting the datamap using both the child directory identifier and the grandchild directory identifier; and
storing the encrypted datamap on the storage system using at least part of the grandchild directory identifier as the key.

The grandchild directory identifier may be derivable from child directory data. Therefore, a user may, using the child directory identifier and the parent directory identifier, access the data of at least one grandchild directory.

The method steps may be repeatable for directories and subdirectories under the grandchild directory. A datamap may be created at each directory level. Therefore, a user may, using the child directory identifier and the parent directory identifier, access multiple levels of stored directories and subdirectories and the associated data under the child directory. The user may drill down and up these levels but not access levels above the child directory.

The storage system may comprise a server-less network. The storage system may comprise a peer to peer network. Alternatively, the storage system may comprise a readable disc.

The step of storing data of the child directory may include encrypting the data to be stored. It should be noted that, for the invention, it is possible to encrypt the contents of a directory or to encrypt the contents of the listing of the directory (or both).

The method may include the step of splitting at least one data element to be stored into a plurality of data chunks. The method may include storing at least one data chunk at a different location on the storage system to the other data chunks.

The storage system may comprise a plurality of nodes of the network and the method may include storing at least one data chunk on a different node to the other data chunks.

The method may include encrypting each data chunk before storing on the storage system.

The method may include the step of obfuscating the data of the child directory before storing on the network. The method may include the step of obfuscating the datamap of the child directory before storing on the network. The step of obfuscating the datamap may be carried our prior to encryption.

The method may include sharing data stored on the storage system with at least one of the plurality of users. The method may include providing a private shared directory and allowing access only to selected peers.

The step of sharing data may include creating a replacement identifier and replacing the parent directory identifier with the replacement identifier.

The step of creating the replacement identifier may include creating a key pair for the user sharing the data. The step of creating the replacement identifier may include creating a user identifier for the user sharing the data, the user identifier derived from the created key pair.

The step of creating the replacement identifier may include creating a second key pair and creating a share identifier from the created second key pair. The replacement identifier may correspond to the created second public key. The replacement identifier may correspond to a hash of the created second public key.

The method may include allowing one or more selected users to read the shared data. The method may include sending a message to each selected user. The sent message may comprise one or more or all of a share name, an identifier and public key for the share, and the generated random key. The sent message may be at least one of signed and encrypted.

The method may include retrieving the encrypted datamap from the network and decrypting the datamap using a hash of the public key for the share and the random key.

The method may include allowing one or more selected users to write to the shared data. The sent message may include the private key for the share to allow modifying of the encrypted datamap.

The method may include providing one or more selected users with administrator access to the shared data. The sent message may include the private key of the first key pair.

The method may include providing a public shared directory. The method may include assigning a publicly known identifier to each user. The method may include storing a datamap of the public shared directory under the hash of the publicly known identifier such that data of the public shared directory may be read using the public identifier.

The method may include providing an anonymous shared directory.

The method may include the step of providing distributed locking to ensure data integrity.

The step of providing distributed locking may include sending a lock request from a node wishing to write to stored data to one or more nodes. The lock request may be sent to a plurality of nodes which are closest to the node wishing to write to stored data. The lock request may be signed by the node wishing to write to stored data.

The method may include configuring one or more nodes, on receiving a lock request, to confer with the or each other node. The method may include rejecting the lock request in the event that two or more separate lock requests are received which relate to the same data. The method may include configuring each of the requesting nodes to pause for a random time period in the event that two or more separate lock requests are received before submitting a further lock request after expiry of the random time period. The method may include setting a system wide lock duration constant.

Figure 2:
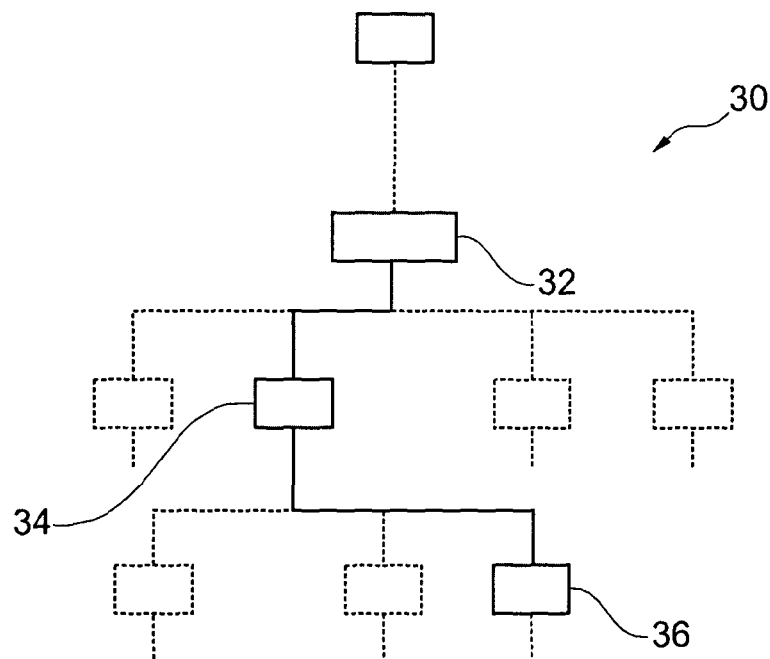

Embodiments of the present invention will now be described, by way of example only, with reference to the accompanying drawings in which:

FIG. 1 is a diagrammatic representation of a network comprising a plurality of nodes; and FIG. 2 is a diagrammatic representation of a hierarchical file structure.

FIG. 1 shows a network 10 of nodes 20, each node 20 associated with a user on the network. Each node 20 can communicate directly with another node on the network 10 without routing through a server or control node. The network 10 is therefore peer to peer.

The network 10, or rather collectively the storage devices 22 or memory of each node 20, also provides a key addressable storage system for storing data on the network 10. The stored data can be in the typical hierarchical structure 30 of various levels of directories, subdirectories and files as shown in FIG. 2. The hierarchical structure 30 can be of any size. The network can also be of any size, from a few nodes 20 within an organization to encompassing any computing device which can access the internet.

As explained below, a user may store data on the network 10 such that it cannot be accessed by another node on the network 10. However, the user can elect to make some or all data accessible to specific or all other users/nodes 20 on the network 10. As is known, the user can share a directory such that all subdirectories and files under the directory are accessible. However, the method of achieving this according to the invention uses a different approach.

The following steps are taken at a particular node 20 to create a child directory (Child) 34 of a parent directory (Parent) 32. Of course, these steps are taken by the node device and the steps are not transparent to the user of the node 20. The user's experience will be substantially the same as when saving data in any conventional system.

A random key (ChildKey) is generated and it is confirmed that this key has not previously been used on the network 10. A child directory identifier (ChildID) is derived from ChildKey, such as by appending random data, and is assigned to the child directory 34. In a similar manner, a parent directory identifier is derived and assigned to the parent directory 32.

A new entry which includes the child directory identifier is created and saved under the parent directory 32. The entry may also contain all required metadata of the child directory 34.

Data of the child directory 34 is encrypted then stored on the network 10 as explained below. A datamap for the stored data is created. This datamap provides the locations of the stored data, each location referenced to details, such as a file name, of the actual data (but not the data itself).

The datamap is then encrypted using both the child directory identifier and the parent directory identifier. The encrypted datamap is stored on the network 10 using the child directory identifier as the key. Decryption of the datamap therefore requires both the child directory identifier and the parent directory identifier. However, the parent directory identifier cannot be derived from the datamap or stored data. The stored data of the child directory can be accessed using the child directory identifier and the parent directory identifier, which are known to the particular node 20.

The stored data of the child directory 34 will typically comprise a number of files as well as at least one grandchild directory 36. These files and the grandchild directory 36 are fully accessible using the child directory identifier and a created grandchild directory identifier. Similar steps as above are carried out for the storage of this data on the network 10.

A second datamap is created which provides the location of the stored data of the grandchild directory 36. An identifier is assigned to the grandchild directory 36. The second datamap is encrypted using both the child directory identifier and the grandchild directory identifier. The encrypted datamap is stored on the network 10 using the grandchild directory identifier as the key.

The grandchild directory identifier is fully derivable from child directory data. Therefore, a user can, using the child directory identifier and the parent directory identifier, access the data of the grandchild directory 36.

These steps are repeated for lower level directories and subdirectories in the hierarchical structure 30 with a datamap created at each directory level. Therefore, using the child directory identifier and the parent directory identifier, a user can access all levels of stored directories and subdirectories and the associated data below (but not including) the parent directory 32.

The present invention therefore provides a directory structure may be traversed forward from the parent directory 32 and with efficient implementation back to that point but no further back unless new knowledge of the structure is gained. This has the effect of allowing directory trees to be free forming rather than tied to any root or base level. A user can have a tree, but it is a free forming tree and not a distributed overall root directory.

The step of encrypting the data to be stored can be carried out as described in WO 2008/065341 which is incorporated herein by reference.

Briefly, this process includes splitting each data element or file of the child directory 34 into a number of data chunks. A datamap (ChildDM) for the child directory 34 is created which gives the location of each data chunk.

A hash of the child directory identifier and parent directory identifier H(ParentID+ChildID) is named Obf, and a data chunk is created (ObfChunk) which is the same size as ChildDM by repeatedly rehashing Obf and appending the result (Obf+H(Obf)+H(H(Obf))+ . . . ). Each data chunk is obfuscated (ObfChunk) and then encrypted. The data chunks are then stored at different locations, even at different nodes 20, on the network 10. A symmetric encryption passphrase (Pass=H(ParentID+ChildID)) is created. The datamap of the child directory 34 is also obfuscated (ObfDM=ChildDM θ ObfChunk) before encrypting (EncDM=SymEnc$_{[Pass]}$(ObfDM)) and then storing on the network 10.

Using the above approach, there is no limit to the number of levels of the hierarchical structure 30 which can be stored.

The method of the invention allows sharing of data stored on the network 10 with other users. To share data, all that is required is access to a decrypted directory or an encrypted directory along with the keys required for decryption. All the directories below this directory are then automatically shared.

For increased security, the step of privately sharing a directory structure can use a replacement identifier for the parent directory identifier, since the node 20 creating the shared root directory does not wish peers to know the parent directory identifier for the directory.

A shared root directory is created as described above with the exception of the encryption element. A replacement is derived, and encryption is carried out as described above. Creating and storing the replacement for the parent directory identifier is done as follows.

A first key pair (ShareOwn$_{priv}$ and ShareOwn$_{pub}$) is created for the user sharing the data. An identifier for the share owner is also created which is derived from the created key pair (ShareOwnID=H(ShareOwn$_{pub}$+Sig[ShareOwn$_{priv}$] (ShareOwn$_{pub}$)). This identifier is stored on the network 10.

While key pairs are being used in this embodiment, it is possible to carry out the method of the invention using symmetric encryption and passing keys between users using any reasonable method.

A further key pair (Share$_{priv}$ and Share$_{pub}$) and identifier for the share are created (ShareID=H(Share$_{pub}$+Sig[ShareOwn$_{priv}$](Share$_{pub}$)). This identifier is stored on the network 10.

The hash of the public key for the share (H(Share$_{pub}$)) is used as the replacement identifier.

The method of the invention allows providing access to only selected peer nodes 20. This is achieved as follows.

Normally a node 20 storing an encrypted datamap (EncDM) of a private non-shared directory would sign the store request and data with a cryptographic private key ($K_{priv}$) known only to itself. A single $K_{priv}$ could be used for all directories, regardless of whether they are in the same tree or not.

However, in the case of a shared directory, it is desirable that peer nodes 20 are able to make modifications and so it is desirable that these peers are able to sign modified datamaps and requests with the original private key. To achieve this, the private key for the share is used when storing an encrypted datamap of a shared directory. The same key is used for all subdirectories of the shared root. However each new shared root directory has a unique private key to allow peer permissions to be assigned on a "per-shared-directory" basis.

The creator of a private shared root directory allocates permissions to selected peer nodes 20. Each selected peer is sent a signed, encrypted message following successful creation of the directory.

All selected peers receive from the message the share name (which is human-readable and selected by the creator) as well as the identifier and public key for the share and the generated random key (ChildKey). This allows retrieval of the encrypted datamap from the network 10 which is stored under the random key. It also allows decryption of the datamap using a hash of the public key for the share and the random key. Each selected peer therefore has read access to the directory and its subdirectories.

For peer nodes 20 given write access, the message also contains the private key for the share to enable them to modify the encrypted datamap held on the network 10.

For peer nodes 20 given administrator access, the message also contains the private key of the first key pair (ShareOwn$_{priv}$) to enable them to alter identifiers for the share, remove users and delete the share completely from the network 10.

To revoke a peer node's access to a shared directory, an administrator node 20 creates a new identifier for the share and first key pair. Then the administrator locks the root of the share, copies the content to the new root and generates a new random key. A message is sent to all authorised peers (but not the peer node 20 with revoked access) as described previously. When an authorised peer receives this message, the share from the new root is re-read.

The administrator then copies all the existing directory structures (locking each in turn) to the new structure, starting at the new root and deleting the old directories recursively.

A peer node 20 will note this action and, if a file is opened, it will wait for the new directory (and datamap) to become available if the current directory is locked, otherwise it is safe to store the file as the recursive 'move' has not reached that point yet.

Each node 20 may also create public shared directory structures which can be accessed (read-only) by any peer. The process for this is similar to as described above but simpler since the datamaps do not need to be encrypted and there is no need to send a message to a group of peers.

The creator of a public shared directory uses a different cryptographic private key ($MPID_{priv}$) to sign the datamap and requests. This private key is not revealed to any peer and can be used for all public shared directories, regardless of whether they are in the same tree or not. All peers can read the data but only the creator can edit it, and so no locks are required.

In order to allow peer nodes 20 to find public shared directories on the network 10, users can be assigned a publicly known identifier (PublicID) such as similar to an email address. The datamap of the root public shared directory is stored under the hash of this identifier (H(PublicID)).

Therefore, data in a public shared directory can be read by any peer node 20 on the network 10 simply using the public identifier. This data may be freely distributed, and browser add-ons can be provided to allow widespread access to the data.

It is also possible to create anonymous shared directory structures. These are similar to public shared directories, but the keys under which datamaps are stored and any signing keys are configured so that they are not traceable back to the user concerned.

When there is multi-user access to particular data, the present invention may utilise a distributed locking mechanism to ensure data integrity. File locking in a Distributed Hash Table (DHT) can be problematic, in particular recovery from stale locks. The invention allows shared directories to be easily set up and maintained.

To write data, a node 20 requests a lock from the nodes responsible for maintaining the data. Lock requests are signed by the sender to allow the K recipients to confirm the permissions of the requester. If the signature validation fails, the requests are rejected.

On receiving a lock, the node 20 is configured to confer with the other nodes; if all nodes 20 accept the lock, then the lock is in place. However, if there is any collision of two separate requests for a lock, then both requests are rejected. When this occurs, the requesting nodes 20 will pause for a random time period and then submit a further lock request. Also, a system wide lock duration constant is set. This allows the removal of any locks that have gone stale.

On receiving a lock, a node 20 reads the data again to confirm it is the same version that has been updated and then updates the value.

The present invention provides a method of storing data in a distributed network in a manner that is readily addressable and searchable and it very scalable.

Whilst specific embodiments of the present invention have been described above, it will be appreciated that departures from the described embodiments may still fall within the scope of the present invention.

The invention claimed is:

1. A method of providing a distributed file system allowing the storage of data comprising a plurality of directories and files arranged in a hierarchical structure on a key addressable storage system, the storage system being accessible by a plurality of users, the method comprising the steps of:
   storing data of a child directory on the storage system and creating a datamap which provides at least one location of the stored data;
   assigning an identifier to the child directory and to a parent directory for the child directory;
   encrypting the datamap using both the child directory identifier and the parent directory identifier as a key; and
   storing the encrypted datamap on the storage system.

2. A method as claimed in claim 1, wherein the step of storing data of the child directory includes encrypting the data to be stored.

3. A method as claimed in claim 1, further comprising the step of obfuscating the data of the child directory before storing on the network.

4. A method as claimed in claim 1, further comprising the step of obfuscating the datamap of the child directory before storing on the network.

5. A method as claimed in claim 1, wherein the stored data of the child directory comprises one or more grandchild directories which are accessible using the child directory identifier and a grandchild directory identifier.

6. A method as claimed in claim 5, including the steps of:
   creating a second datamap which provides at least one location of the stored data of the grandchild directory;
   assigning an identifier to the grandchild directory;
   encrypting the datamap using both the child directory identifier and the grandchild directory identifier; and
   storing the encrypted datamap on the storage system using at least part of the grandchild directory identifier as the key.

7. A method as claimed in claim 1, including the step of splitting at least one data element to be stored into a plurality of data chunks.

8. A method as claimed in claim 7, including encrypting each data chunk before storing on the storage system.

9. A method as claimed in claim 7, further comprising storing at least one data chunk at a different location on the storage system from the other data chunks.

10. A method as claimed in claim 9, wherein the storage system comprises a plurality of nodes of the network, and the method includes storing at least one data chunk on a different node to the other data chunks.

11. A method as claimed in claim 1, further comprising sharing data stored on the storage system with at least one of the plurality of users.

12. A method as claimed in claim 11, further comprising providing a private shared directory and allowing access only to selected peers.

13. A method as claimed in claim 11, wherein the step of sharing data includes creating a replacement identifier and replacing the parent directory identifier with the replacement identifier.

14. A method as claimed in claim 13, wherein the step of creating the replacement identifier includes creating a key pair for the user sharing the data.

15. A method as claimed in claim 14, wherein the step of creating the replacement identifier includes creating a user identifier for the user sharing the data, the user identifier derived from the created key pair.

16. A method as claimed in claim 14, wherein the step of creating the replacement identifier includes creating a second key pair and creating a share identifier from the created second key pair.

17. A method as claimed in claim 16, wherein the replacement identifier corresponds to a second public key of the created second key pair.

18. A method as claimed in claim 16, wherein the replacement identifier corresponds to a hash of a second public key of the created second key pair.

19. A method as claimed in claim 1, including the step of providing distributed locking to ensure data integrity.

20. A method as claimed in claim 19, wherein the step of providing distributed locking includes sending a lock request from a node wishing to write to stored data to one or more nodes.

21. A method of providing a distributed file system allowing the storage of data comprising a plurality of directories and files arranged in a hierarchical structure on a key addressable storage system, the storage system being accessible by a plurality of users, the method comprising the steps of:
- storing data of a child directory on the storage system and creating a datamap which provides at least one location of the stored data;
- assigning an identifier to the child directory and to a parent directory for the child directory;
- encrypting the datamap using both the child directory identifier and the parent directory identifier as a key; and
- storing the encrypted datamap on the storage system
- splitting at least one data element to be stored into a plurality of data chunks;
- storing at least one data chunk at a different location on the storage system from the other data chunks;
- creating a replacement identifier and replacing the parent directory identifier with the replacement identifier to share data stored on the storage system with at least one of the plurality of users; and
- providing a private shared directory and allowing access only to selected peers.

* * * * *